US007167891B2

(12) United States Patent
Tang et al.

(10) Patent No.: US 7,167,891 B2
(45) Date of Patent: Jan. 23, 2007

(54) NARROW DATA PATH FOR VERY HIGH RADIX DIVISION

(75) Inventors: Ping T. Tang, Hayward, CA (US); Warren E. Ferguson, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 10/394,952

(22) Filed: Mar. 21, 2003

(65) Prior Publication Data

US 2004/0186873 A1 Sep. 23, 2004

(51) Int. Cl.
*G06F 7/535* (2006.01)

(52) U.S. Cl. ...................... 708/654; 708/656
(58) Field of Classification Search ......... 708/654–656
See application file for complete search history.

(56) References Cited

U.S. PATENT DOCUMENTS

| | | | | |
|---|---|---|---|---|
| 4,337,519 | A | | 6/1982 | Nishimoto |
| 5,020,017 | A | * | 5/1991 | Ooms et al. ................ 708/650 |
| 5,475,630 | A | * | 12/1995 | Briggs et al. .............. 708/654 |
| 6,078,939 | A | | 6/2000 | Story et al. |
| 6,141,670 | A | | 10/2000 | Story et al. |
| 6,782,405 | B1 | * | 8/2004 | Matula et al. ............. 708/504 |
| 6,847,986 | B2 | * | 1/2005 | Inui ........................... 708/656 |
| 2001/0027461 | A1 | * | 10/2001 | Peterson .................... 708/654 |
| 2003/0135531 | A1 | * | 7/2003 | Beaumont-Smith et al. ................... 708/504 |
| 2004/0167956 | A1 | * | 8/2004 | Vihriala .................... 708/654 |

FOREIGN PATENT DOCUMENTS

| | | |
|---|---|---|
| GB | 2296350 | 6/1996 |
| WO | WO-04095260 A1 | 11/2004 |

OTHER PUBLICATIONS

"International Search Report for corresponding PCT Application No. PCT/US2004/005664", (Oct. 14, 2004),3 pgs.

Briggs, W. S., et al., "A 17×69 Bit Multiply and Add Unit With Redundant Binary Feedback and Single Cycle Latency", *Proceedings of the 11th Symposium on Computer Arithmetic*, (Jun. 29-Jul. 2, 1993, Windsor, Ontario, Canada, Sponsered by the IEEE Computer Society),(1993),163-170.

Ercegovac, M. D., et al., "Very High Radix Division With Selection by Rounding and Prescaling", *Proceedings of the 11th Symposium on Computer Arithmetic*, (Jun. 29-Jul. 2, 1993, Windsor, Ontario, Canada, sponsored by the IEEE Computer Society),(1993),112-119.

Fandrianto, J., "Algorithm for High Speed Shared Radix 8 Division and Radix 8 Square Root", *Proceedings: 9th Symposium on Computer Arithmetic*, IEEE Computer Press, 1989,68-75.

(Continued)

*Primary Examiner*—D. H. Malzahn

(57) ABSTRACT

Methods, machines, and systems are provided for very high radix division using narrow data paths. A numerator and denominator are received for a very high radix division calculation. An approximate reciprocal of the denominator is obtained from a data structure. The numerator and denominator are pre-scaled by the reciprocal. The denominator is decomposed to an equivalent expression that results in a number of leading insignificant values. Next, modifying a current remainder by forming a first product and subtracting the equivalent expression iteratively assembles a quotient.

2 Claims, 3 Drawing Sheets

OTHER PUBLICATIONS

Taylor, G. S., "Radix 16 SRT Dividers With Overlapped Quotient Selection Stages—A 225 Nanosecond Double Precision Divider for the 2-1 Mark IIB", *Proceedings: 7th Symposium on Computer Arithmetic*, (Jun. 4-6, 1985, University of Illinois, Urbana, IL, sponsored by the IEEE Computer Society),(1985),64-71.

Wong, D., et al., "Fast Division Using Accurate Quotient Approximations to Reduce the Number of Iterations", *IEEE Transactions on Computers*, 41(8), (1992),981-995.

* cited by examiner

US 7,167,891 B2

NARROW DATA PATH FOR VERY HIGH RADIX DIVISION

TECHNICAL FIELD

Embodiments of the present invention relate generally to radix division, and more particularly to reducing a data path for implementations of radix division in microprocessor architectures.

BACKGROUND INFORMATION

Floating point performance is a key focus of modern microprocessor architecture. Among the four basic floating-point operations addition, subtraction, multiplication, and division, division is the most resource intensive operation for microprocessing architectures. Recently, advances have been achieved in making very high radix (number base, e.g. 2 (binary), 10 (decimal), 16 (hexadecimal), and the like) digit recurrence algorithms practical to implement. By very high radix, we mean that the number of quotient digits generated by each iteration of the algorithm is much larger than the typical traditional algorithms that yield 1 bit (radix-2), 2 bits (radix-4), 3 bits (radix-8), or 4 bits (radix-16). It is practical for these very high radix division algorithms to generate on the order of 10 bits (radix-1024) or 20 bits (radix-1048576) during an algorithm's iteration. One common drawback of these algorithms, however, is that the internal data width grows in a somewhat unnatural way.

For example, traditional digit recurrence division algorithms have as their central computational step the update of the remainder: $R_{j+1}=r \times R_j - q_{j+1} \times Y$. Here, R is the remainder, r is the radix, $q_{j+1}$ is the quotient digit, and Y is the divisor (e.g., denominator). The bulk of the work is in computing the product $q_{j+1} \times Y$. The width of Y remains fixed while the width of $q_{j+1}$ grows with the radix. Generally, the radix is an integral power of 2, so $r=2^m$ for some integer m. When this is the case, the multiplier needs to handle an m-by-L multiplication, where L is the data width of the precision in question (e.g., L=53 for Institute of Electrical and Electronics Engineers (IEEE) standards of double precision). In other words, the depth of the multiplier is the number of additional quotient data bits the algorithm generates per iteration, and the width of the multiplier is fixed at the data width of the precision in question.

For traditional digit recurrence division algorithms, only the depth of the multiplier grows with the radix of the algorithm. The unnatural growth with recently developed very-high-radix division algorithms occurs because the multiplier for these operations must instead be able to handle an m-by-(L+m) multiplication. That is, the width of the multiplier grows as well. This requirement is a direct outcome of a crucial "pre-scaling" step (e.g., divisor or denominator reciprocal, discussed in the Detailed Discussion Section below) in this class of algorithms that make them practical to implement. While it is generally accepted that only the depth of the multiplier affects division operation speed, the growth of the width leads, nevertheless, to a number of drawbacks. The more obvious drawbacks are increased space and increased power consumption. The less obvious but ever growing important drawback is the need for a customized multiplier and/or adder rather than those most naturally found in standard cell libraries related to the precision width L in question.

Therefore, there is a need for improved implementations and techniques for radix division. These implementations and techniques should be as fast as some of the recent radix division algorithms, but capable of maintaining the width of the multiplier such that space usage and power consumption is minimized and thus reduced when compared to existing and conventional radix division implementations.

DESCRIPTION OF THE EMBODIMENTS

Novel methods, machines, and systems for very high radix division are described. In the following detailed description of the embodiments, reference is made to the accompanying drawings, which form a part hereof, and in which is shown by way of illustration, but not limitation, specific embodiments of the invention that may be practiced. These embodiments are described in sufficient detail to enable one of ordinary skill in the art to understand and implement them, and it is to be understood that other embodiments may be utilized and that structural, logical, and electrical changes may be made without departing from the spirit and scope of the present disclosure. The following detailed description is, therefore, not to be taken in a limiting sense, and the scope of the embodiments of the inventions disclosed herein is defined only by the appended claims.

Figure 1:
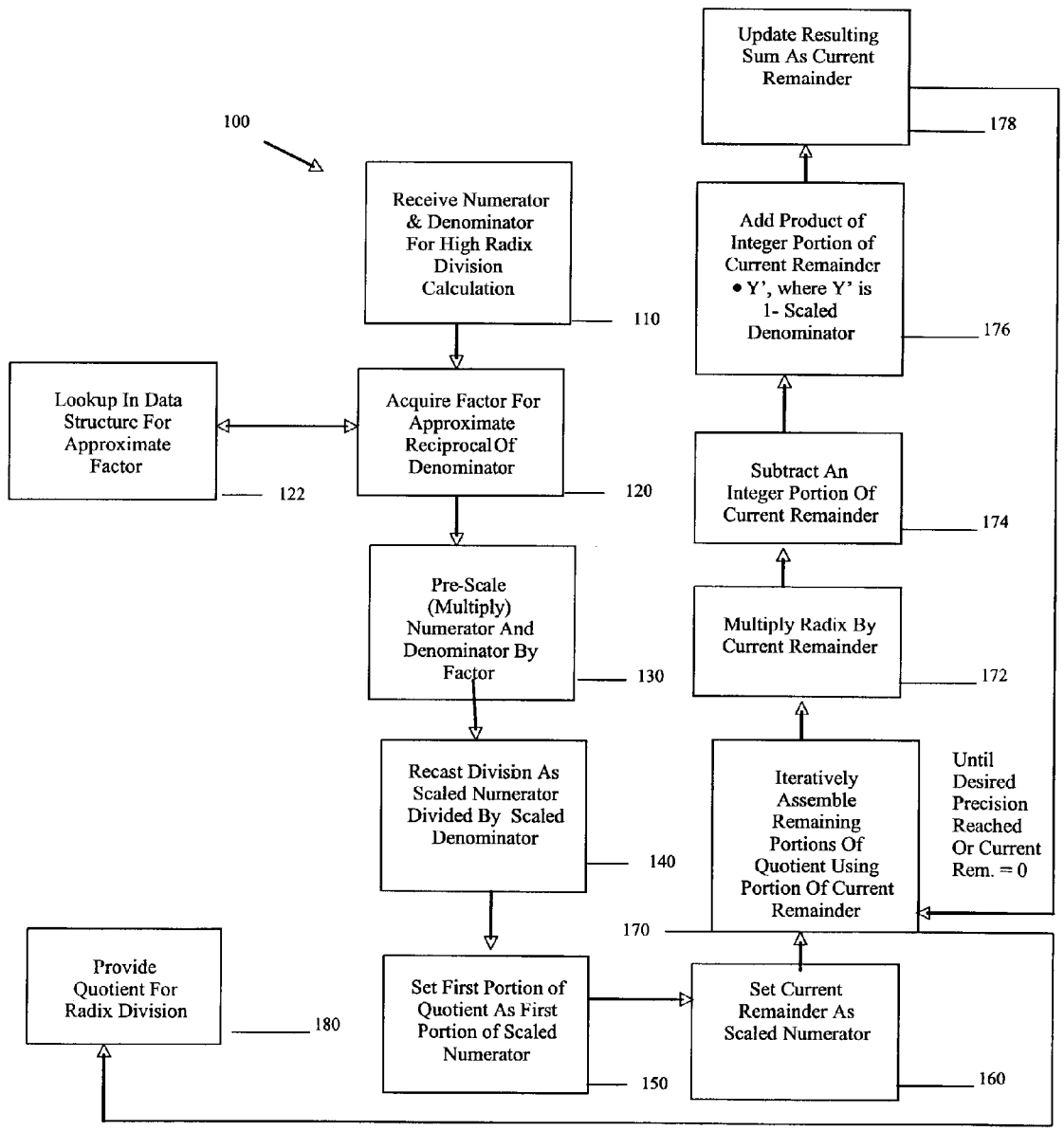
FIG. 1 is a flow diagram of a method for performing very high radix division, in accordance with one embodiment of the invention.

FIG. 1 illustrates a flow diagram of one method 100 for performing very high radix division, in accordance with one embodiment of the invention. The method 100 is implemented in microprocessor architectures. Moreover, the method 100 can be implemented in hardware, software, firmware, or in combinations of hardware, software, and firmware within or accessible to microprocessor architectures.

As will be demonstrated to one of ordinary skill in the art, in the description that follows, embodiments of method 100 permit very high radix division calculations to be decomposed in a novel manner that result in narrow data paths. In contrast, existing and conventional decompositions perform very high radix divisions where wide data paths are necessary. Thus, microprocessor architectures implementing embodiments of method 100 experience a decrease in space utilization and accordingly a decrease in power consumption when performing very high radix division. This is achieved without adversely impacting processor throughput. This is a significant advantage over conventional techniques, since as microprocessor architectures become increasingly smaller in the industry; the ability to conserve power is a growing concern.

At 110 a numerator and denominator (e.g., divisor) are received as operands for a very high radix division calculation. The division calculation is pre-scaled (e.g., preprocessed) into an equivalent mathematical calculation before a quotient for the calculation is determined. This is achieved by attempting to make the denominator of the division calculation approximately 1. By making the denominator or divisor 1, the division calculation becomes straightforward, since any numerator divided by 1 will equal the numerator.

Thus, in order to recast the original division calculation such that the denominator is approximately 1, an approximate reciprocal of the denominator is necessary, since the reciprocal of any number N (1/N) when multiplied by the number is equal to 1 (e.g. 1/N×N=1). However, because the reciprocal of a number N may not terminate (e.g., continues to infinity), some desired and configurable precision of the approximate reciprocal can be used. Accordingly, at 120, a factor representing a desired precision for an approximate reciprocal of the denominator is acquired. In one embodiment, at 122, an approximate factor is obtained by performing a lookup in a data structure (e.g., table or other data structure). This permits rapid and efficient acquisition of the factor as the original division calculation is being restated in a more efficient format for processing.

As one of ordinary skill in the art appreciates, the data structure having the reciprocal value for the denominator need not store all number possibilities, since a subset of numbers can be used and then calculated to the proper reciprocal value. For example, a data structure may house only the approximate reciprocal values for number digits 1–9 (where the radix is decimal (base 10)). Of course, in actuality only 2–9 may be stored since it is readily known the reciprocal of 1 is 1. Reciprocal values for all other number possibilities can be readily calculated based on this small data structure, because these remaining possibilities are only off by a factor of the radix (e.g., decimal (base 10)). For example, the reciprocal of 1 is 1, and the reciprocal of 10 is 0.1. Moreover, the reciprocal of 7 is approximately 0.14, and the reciprocal of 71 is approximately 0.014. Of course any desired level of precision can be configured to the requirements or desires of the underlying microprocessor architecture. Thus, to increase precision the data structure could store reciprocals for numbers 2–99, 11–99, 10–99, or other subsets of numbers. Moreover, the number of significant digits for the stored reciprocal values can be tailored to the requirements or desires of the underlying architecture. Thus, if only digits 2–9 were stored in the data structure, the actual values can include more than 2 significant digits. For example, the reciprocal of 7 can be stored as 0.142857142 having 8 significant digits.

Next, at 130, the original division calculation is pre-scaled (e.g., preprocessed or decomposed) to a new processing format where the original denominator is approximately 1. This is achieved by multiplying the original numerator and the original denominator by the acquired approximate denominator reciprocal factor. Thus, the new processing format for the division calculation is recast, at 140, to a mathematical equivalent represented by a scaled numerator (e.g., original numerator X factor) divided by a scaled denominator (e.g., original denominator X factor). The multiplication is applied to both the numerator and the denominator so the restated division calculation is mathematically equivalent to the original division calculation.

At this point the first digit of the scaled numerator is a first portion of a quotient for results associated with the original division calculation. This is so, because the scaled denominator is approximately 1, and any number divided by 1 is the number itself. Thus, at 150, the first portion of the quotient can be set as the first digit of the scaled numerator.

By way of illustration only and for purposes of understanding, consider an original division calculation of 3/7. Using the description detailed above, the reciprocal of 7 is approximately 0.14 (e.g., where our reciprocal data structure is accurate to approximately 2 significant digits). Thus, when we recast the calculation, the scaled numerator becomes 0.42 (3×0.14) and the scaled denominator becomes 0.98 (7×0.14). The newly restated calculation is thus 0.42/0.98; the first portion of the quotient for the original calculation of 3/7 is 0.4. One of ordinary skill in the art appreciates, that the above is presented for purposes of illustration only, since very high radix division would most likely entail more precision than presented in the this example. Yet, the example assists in more easily understanding how various embodiments of the present invention decompose an original division calculation by restating the calculation in a format more easily and efficiently processed by microprocessor architectures.

Next, embodiments of the present invention begin to decompose the restated division calculation in a novel manner. Accordingly, at 160, a running variable defined as a current remainder is initially set to be the scaled numerator. At 170, method 100 enters a processing loop that continues until the quotient reaches a desired level of precision (in IEEE this is L=53 for double precision, where L is the data bit width for the precision) is reached or until the current remainder is zero, indicating a termination has occurred in the division calculation. Correspondingly, at 170, the quotient is iteratively assembled using a portion of the then current remainder. The first time into the processing loop, the processing at 170 does not need to occur since this was initially handled before entering the loop at 150. Alternatively, the processing at 150 can be removed and handled by the processing at 170. In this case, the processing at 170 need not make a check to determine if it is processing a current remainder for a first time within the loop.

At 172, a first product is a radix (number base being used, e.g., binary, decimal, hexadecimal, and others) multiplied by the current remainder. This first product is then altered further at 174 by subtracting an integer portion of the current remainder. In one embodiment, the integer portion is the first digit of the current remainder and made a whole integer number. This can be done because our scaled denominator is nearly or approximately 1, and the division calculation can be decomposed in a novel manner.

For example, in traditional manual division one would determine a present remainder for a developing quotient by taking a first product of the then existing current remainder multiplied by the radix and then subtracting a second product representing the denominator (e.g., divisor) multiplied by some new number N. Thus, for example, when dividing 3/7 we would manually solve this calculation by forming a first product represented by multiplying 3 (e.g., current remainder)×10 (e.g., radix is base 10 (decimal)) and subtracting a second product represented by 7 (e.g., the divisor or denominator)×N (some integer number). We intuitively know that N is equal 4, in order to make this second product (e.g., 7×4=28) close to, but less than our first product (e.g., 3×10=30).

However, in embodiments of the present invention, the division calculation is restated as a scaled numerator divided by scaled denominator (which is approximately 1), thus, N can be automatically selected as the first digit integer portion of the current remainder, which we did in our example of 0.42/0.98 (e.g., 3/7 restated to a mathematical equivalent). Thus, our first digit integer value (0.4 for the present example) is readily obtained from the current remainder.

Moreover, the original calculation used to solve for a quotient digit is presented as a second product subtracted from a first product. The first product is the current remainder multiplied by the radix, and the second product is some number N multiplied by our scaled denominator (e.g., divisor). The second product is decomposed in a novel manner, which decreases the data width required to solve for a value of the second product, for microprocessor architectures that implement embodiments of the present invention.

This is achieved by decomposing the divisor (e.g., scaled denominator) to be represented as a mathematically equivalent expression. Since, the divisor (e.g., scaled denominator) is approximately 1, if the scaled denominator is subtracted from 1, then the sum of this subtraction will include one or more initial or leading digits that are 0 or 1. Leading insignificant 1's can occur when the subtractions results in a negative number, such as when the scaled denominator was greater than 1 when using an approximate factor that was greater than 1. The leading zeros or ones are insignificant numbers and will not occupy additional data width within microprocessor architectures. Therefore, the leading zeros or ones will decrease the data width of the second product, if the second product is also restated in a mathematically equivalent manner. The equivalent expression for the divisor can be stated as 1−Y', where Y' is some number that when subtracted from 1 equals the scaled denominator. For example, in the previous example the scaled denominator was 0.98 and if we set an equation to be 1−Y'=0.98 and solve for Y' we find that Y' is 0.02, but if we express the equation in terms of the Y', we find Y'=1−0.98 (e.g., where 0.98 is the scaled denominator or the divisor). Thus, the scaled denominator equals 1−(1−Y) and Y'=1-scaled denominator.

The second product can now appear as the equation of the first integer portion of the current remainder (since scaled denominator is approximately 1) multiplied by the sub equation represented by 1−Y' (this is how the scaled denominator is being expressed), where Y' was 1-scaled denominator. The second product can be further decomposed to another mathematically equivalent equation by distributing the first portion of the current remainder over the sub equation 1−Y'. Thus, the second product will now be represented as the first integer portion of the current remainder (e.g., current remainder multiplied by 1 the first part of the sub equation) minus the product of the first integer portion of the current remainder multiplied by Y'. The product will include less significant digits and occupy less data width within microprocessor architectures, than it would have if we had multiplied the first integer portion of the current remainder directly against the scaled denominator or divisor, because Y' includes one or more insignificant leading zeros or ones, whereas the raw scaled denominator did not include any insignificant leading zeros or ones. Thus, the decomposition of the scaled denominator to be restated in a mathematically equivalent manner is space efficient.

It has now been demonstrated that the division calculation to determine quotient digits can be stated as a first product (radix multiplied by the first integer portion of the current remainder) minus a second product. The second product is equal to the first integer portion of the current remainder minus the product of the first integer portion of the current remainder multiplied by Y', and Y' is know as 1-scaled denominator. If we distribute the negative sign across the second product (since the second product must be subtracted from the first product), the equation becomes the first product added to a negative first integer portion of the current remainder and a positive product value (the negative sign becomes positive) of the first integer portion of the current remainder multiplied by Y'.

Thus, the entire equation for solving for digits of a quotient can be expressed as subtracting the first integer portion of the current remainder from a first product represented as the first integer portion of the current remainder multiplied by the radix and then subtracting a product represented by multiplying the first integer portion of the current remainder against Y', and Y' is equivalent to 1-scaled denominator.

Having restated and decomposed the original division calculation, we can return to the discussion of FIG. 1. The first product in the iterative loop is the current remainder multiplied by the radix as depicted at 172, next at, 174 we subtract the first integer portion of the current remainder from the first product. Then, at 176, we add the product of Y' multiplied by the first integer portion of the current remainder, where Y' is equal to 1-scaled denominator. Accordingly, at 178, the resulting sum is updated as a new value for the current remainder, processing then continues again at 170 until a desired precision is reached or the current remainder is equal to zero. Once this occurs, all the digits for the quotient are provided at 180 to the desired or configured precision required.

When doing high radix division the processing that requires the most space or area within a microprocessor, and correspondingly the most power consumption, is the computation of the divisor multiplied by some number N. Traditional architectures may recast the original division calculation in terms of a scaled numerator divided by scaled denominator in order to acquire processing efficiency, such that N is the first portion of a current remainder, but these traditional architectures do not decompose the scaled denominator in the novel manner (1−Y) presented with the embodiments of the present invention. As a result, in traditional architectures, the data width of this calculation is more than what is necessary to solve the division calculation. This is so because the scaled denominator that is not decomposed into a mathematical equivalent (1−Y') will include no leading insignificant ones or zeros. Thus, with conventional techniques the scaled denominator (which is has significant digits to a desired precision) when multiplied by the first portion of the current remainder will exceed the desired level of precision.

In contrast, the embodiments of the present invention decompose the processing for determining the product of the scaled denominator multiplied by the first portion of the current remainder, such that the data width required in performing the division calculation is reduced. This is so because Y' is represented as 1-the scaled denominator (which is approximately 1), and thus Y' will include one or more insignificant leading digits that are 0 or 1. Therefore, when this multiplication is performed less data width is required to obtain the resulting product. The data width of the multiplication is the data width of the desired precision. Correspondingly, microprocessor architectures that implement embodiments of the present invention can perform high radix division with less space with less power consumption than what has been conventionally required. As one of ordinary skill in the art appreciates, power efficiency is directly proportional to area or space used, and since embodiments of the present invention require less area or space, less power consumption is needed.

Moreover, the novel decomposition and processing of the embodiments of the present invention are more amenable to cell-based microprocessor designs. With the growth of microprocessor cell complexity cell-based designs have become important design considerations that are needed to reduce time to market latencies. For example, rounding operations at the end of division iterations require carry-propagate addition to be performed on a remainder. The embodiments of the present invention can use an adder cell that handles normal data width associated with a desired precision for high radix division with microprocessor architectures.

Conversely, traditional architectures require adder cells that need to handle data widths in excess of the desired precision level, because the product of the current remainder multiplied by the scaled denominator results in significant digits in excess of the desired precision level. As another example, many microprocessor architectures require special multiplier cells for performing multiplication when high radix division is required. The embodiments of the present invention require no such special multiplier cells, in order to perform high radix division.

Figure 2:
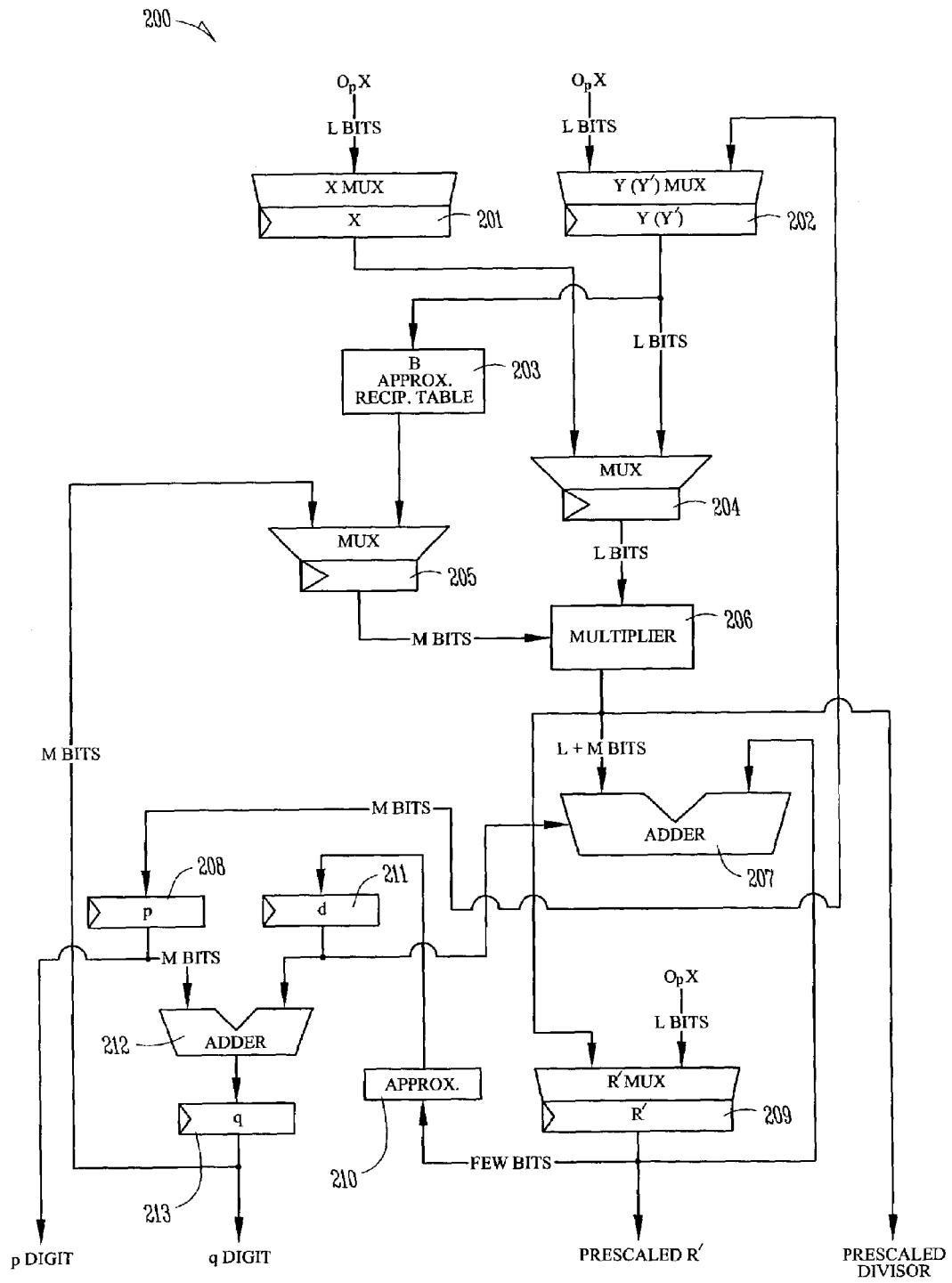
FIG. 2 is a diagram depicting a machine implementation for performing very high radix division, in accordance with one embodiment of the invention.

FIG. 2 illustrates a diagram 200 depicting one machine implementation for performing very high radix division, in accordance with one embodiment of the invention. The machine architecture can include standard cell libraries associated architectures for adders and multipliers when performing high radix division. The machine implementation depicted in diagram 200 is presented for purposes of illustration and not by way of limitation. Accordingly, a variety of other configurations or combinations of hardware, software, and/or firmware can also be used without departing from embodiments of the present invention.

A first operand X having a bit width of L bits is received by multiplexer (Mux) 201. Simultaneously, in parallel, or subsequently Mux 202 receives a second operand Y having a data width of L bits. Operand X is associated with a numerator of a very high radix division, and operand Y is associated with a denominator of the very high radix division. L is the number of significant digits used by the machine architecture to perform the very high radix division calculation at a desired precision. The radix (r) at the machine level is a binary power of 2, where the power is represented as m (e.g., $2^m$).

Y is fed to an approximate reciprocal table data structure 203, in order to acquire an approximate reciprocal factor for Y. Concurrently, X and Y are fed to Mux 204. Also, the approximate reciprocal factor is provided to Mux 205. Next, the sum of the partial products of X and Y are produced by Mux or adder 206 (can also be a multiplier), using the approximate reciprocal factor acquired from Mux 205. Mux 205 feeds m bits of the approximate reciprocal at a time to Mux or adder 206 for processing. Multiplier 206 (can be a Mux or adder as well) multiplies m bits of the approximate reciprocal factor against the X and Y to restate the original division calculation as scaled X divided by scaled Y, where scaled Y is now approximately or near a value of 1, since the approximate reciprocal of Y is now multiplied by Y.

Multiplier 206 is designed to handle calculations for an m by L bit width array. In the case where multiplier 206 is an adder 206, the adder is designed to handle adding L bits plus L bits. Scaled Y is then adjusted in multiplier 206 to be represented as Y'=1−B multiplied by scaled Y, where B is the approximate reciprocal factor of Y). This is used to decompose the division calculation by expressing scaled Y as Y' in terms that will results in leading insignificant bits (discussed above with FIG. 1 as leading insignificant zeros or ones). Because this is done, the architecture of diagram 200 can process high division radix division with standard architectures associated with cell multipliers and adders designed to process calculations having bit array dimensions of L by m or adding L bits plus L bits, respectively. Conversely, traditional architectures would need a multiplier capable of handling m by (m+L) bit width arrays or adders capable of handling adding data bit widths of m+L. X' is then multiplied in multiplier 206 by r (e.g., radix represented as $2^m$).

This reduction in significant bits will be realized in subsequent iterations through diagram 200. However, one of ordinary skill in the art appreciates this is not really a multiplication at all, all that is needed is a movement of the binary decimal point or simple bit alignment when multiplication of some number N is multiplied by radix r.

The leading digits (discussed as the first integer portion of the current remainder above with FIG. 1) are stripped in adder 207 and stored as p in register 208. The trailing digits are stripped in adder 207 and provided to Mux 209. These trailing digits are represented as R'. Next, in order to adjust p to account for rounding such as when the first few bits of R' are greater than some threshold (e.g., decimal fractional numbers greater than or equal to 0.5 are rounded to 1) an adjustment can be made, in some embodiments, such that a rounding occurs to approximate R' to a higher value in Mux or adder 210. For example, with a decimal r having current remainder represented as 0.478, p can be thought of as 4 (the first integer portion) and R' can be thought of as 0.78. In this example, the 0.78 can be rounded in Mux or adder 210 to be 1. The adjusted value of R' is stored as d in register 211. This rounding is used to adjust p in adder 212 to a potentially rounded (although not always required or needed) value for a quotient digit q, which is stored in register 213.

The discussion thus far has been to determine the first and initial digit $q_0$ for a desired quotient Q. The architecture in diagram 200 is designed to iterate a number of times to produce a full Q at a desired precision or until a current remainder is 0. The number of iterations for a Q that is populated to the desired precision will be L/m, where L is the number of significant digits required for a desired precision and m is the number of bits per iteration that diagram 200 is designed to process for high radix division calculations.

Subsequent iterations to populate Q can proceed as follows. Y' is fed back to Mux 202 for each iteration, this falls through Mux 204 and multiplier 206 unmodified. Mux or adder 206 then provides Y' to adder 207 and the previous selected digit q. Adder 207 also receives a previously potentially rounded representation of the trailing remainder R' represented in the diagram as d, and adder 207 receives the previous R'.

With iterations that occur after the first or initial iteration, adjustments in adder 207 may need to be made to the previously determined value for Q digit q, since q may have been rounded. Thus, adder 207 compares the previous R' against d to see if a rounding to q has occurred, and if it has then q is adjusted back to an non rounded version of q. This is done to ensure accuracy in the very high radix division for all iterations. Next, adder 207 assembles the current remainder as q+R' and multiplies this against the radix (r) to acquire the first product for the next cycle of the division. Adder 207 also multiplies q against Y' to form a second product. Next, q is subtracted from the first product and the result is added to the second product. At this point, we now have the information necessary for determining the next Q digit $q_{j+1}$.

Accordingly, adder 207 strips the first few bits of the resulting calculation and stores this in register 208 as $p_{j+1}$, the trailing portion of the result becomes the next trailing remainder $R'_{j+1}$ and is provided to Mux 209. Next, in 210 R' is processed to a value for d and the result is stored in register 211 as $d_{j+1}$. Note, that if $R'_{j+1}$ did not require rounding, then the value for $d_{j+1}$ is 0 and still processed. Adder 212 then adds $d_{j+1}$ to $p_{j+1}$ to produce the next quotient digit $q_{j+1}$, which is stored in register 213.

As was previously discussed the high radix division processing continues until a desired level of precision is reached (e.g., L bits for Q or L/m iterations) or until a current remainder has a zero value.

The processing of diagram 200 can also be expressed in a formal notation to reflect processing logic of the various components of FIG. 2. One example notation is as follows. In a preprocess iteration where we determined that Y' should be decomposed or re-expressed in a format where we have leading insignificant bits can be expressed as B=the approximate reciprocal of Y and Y'=1−B×Y.

The initialization or first iteration can be expressed as Initialization: $p_0 + R_0' = X'$, where X' is the scaled X (e.g., numerator), $Q_0=0$, $j \leftarrow 0$, $r=2^m$=radix, where the subscript 0 indicates an initial or first iteration such that the value for j=0, identifying a first iteration. The Quotient digit selection can then be expressed as $\delta_j$=Approx round to integer $(r \times R_j')$, $q_{j+1} = rp_j + \delta_j$. The quotient digit selection begins the main processing loop in diagram 200. As was described above, a quotient digit qj+1 can be rounded thus $\delta_j$ reflects this adjustment that is being made in diagram 200 to quotient digits $q_{j+1}$. Also, within the main processing loop the remainder processing can be expressed as $p_{j+1} + R'_{j+1} = r \times R'_j + q_{j+1} \times Y' - \delta_j$. Next, the update processing of the quotient with the next selected quotient digit $q_{j+1}$ can be expressed as $Q_{j+1} = Q_j + q_{j+1} / r^{j+1}$. $j \leftarrow j+1$. Finally, iterations proceed back to the quotient digit selection until the quotient has obtained L bits (L/m iterations).

It has now been demonstrated how very high radix division can be decomposed in a novel manner to permit processing that can be handled by microprocessor architectures using narrow data paths. Moreover, embodiments of the present invention permit very high radix division to be processed using standard cell libraries. As a result, microprocessor architectures implementing the techniques of the embodiments of the present invention experience a more space efficient solution resulting in a decrease in power consumption.

Further, it is to be understood that the diagram 200 is presented for purposes of illustration only. Thus, other cell library configurations are foreseen that implement the novel decomposition of the embodiments of the present invention. Therefore, the embodiments of the present invention are intended to include any such configuration that implements the novel decomposition of radix division presented herein.

Figure 3:
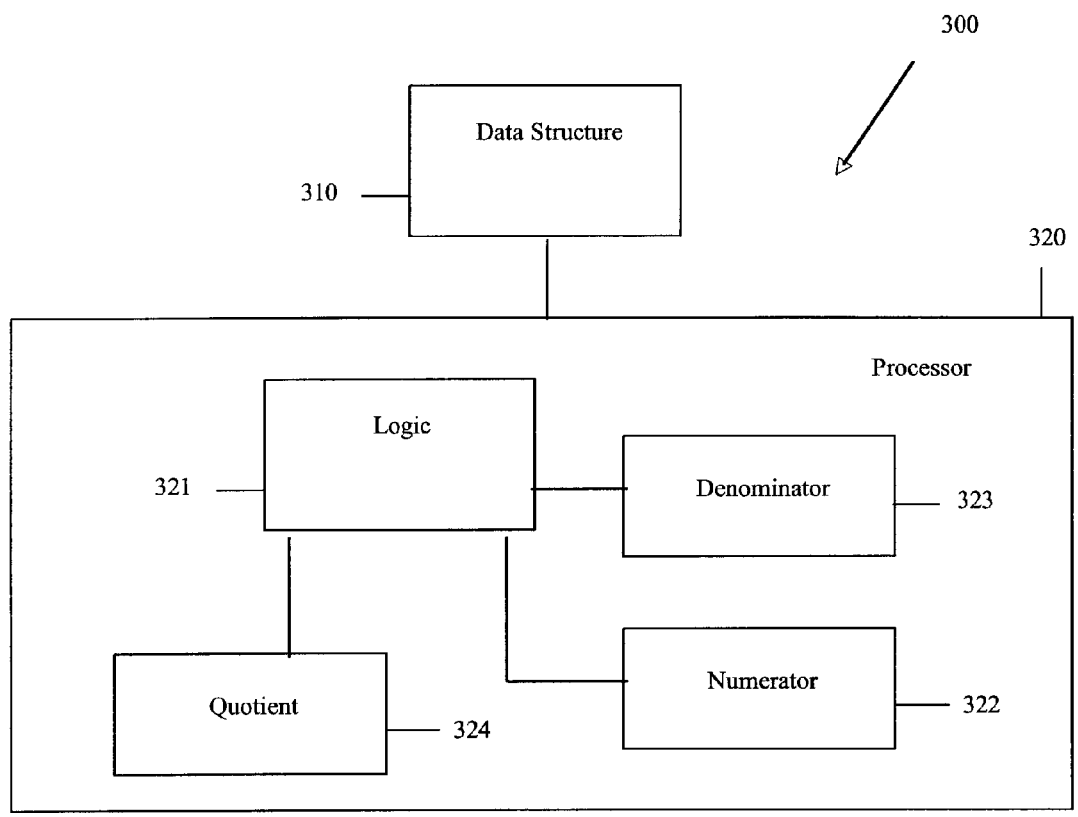
FIG. 3 is a diagram of a very high radix division system, in accordance with one embodiment of the invention.

FIG. 3 illustrates a diagram of a very high radix division system 300, in accordance with one embodiment of the invention. The high radix division system includes a data structure 310 and a processor 320. The processor includes logic 321, and space for housing a numerator 322, a denominator 323, and a quotient associated with a high radix division calculation. FIG. 3 is presented for purposes of illustration only and is not intended to be limiting, since it is readily apparent that in some embodiments the data structure 310 can also be included within a register or area of the processor 320. In fact, any embodiment where the data structure 310 is accessible to the logic 321 is intended to fall within the broad scope of the present invention. Moreover, the logic 321 can be hardware components, firmware components, software components, or a combination of hardware, firmware, and software.

The data structure 310 is an approximate reciprocal table for integer numbers. The number of significant digits represented in the data structure 310 is configurable. Moreover, as was discussed above with FIG. 1, the data structure 310 need not store all possible integers since factors can be readily derived based on the radix being used for the very high radix division. Thus, for a decimal radix only integers 2–9 (no need for 1 since the reciprocal of 1 is 1) need to be represented in the data structure 310, since all other integer possibilities can be derived from factors for these integers using the radix. Of course it is readily apparent that to obtain a higher degree of precision the data structure 310 can include integer possibilities for large sets of integers (e.g., 2–99, 10–99, 11–99, or other combinations for a decimal radix). Additionally, the data structure 310 need not be a table in all embodiments, since any data structure 310 that is accessible to the logic 321 can be used.

Initially, the logic 321 accesses the numerator 322 and the denominator 323. Next, the logic 321 accesses the data structure 310 to acquire an approximate reciprocal factor for the denominator 323. In some embodiments, the logic 321 may need to derive the approximate reciprocal factor from a value obtained from the data structure 310 by using a radix associated with the very high radix division, such as when the denominator is not directly represented directly in the data structure 310.

Once an approximate factor is obtained or derived, the logic 321 multiplies the numerator 322 and the denominator 323 by the factor in order to restate the division in a more efficient manner. At this point, the numerator 322 is represented as a scaled numerator and the denominator is represented as a scaled denominator. The scaled denominator is approximately 1, which simplifies the division. Next, the scaled denominator is decomposed into an equivalent expression that is used for processing the division.

The equivalent expression represents the fact that the division will be iteratively processed to solve for quotient 324 digits. Thus, as was discussed above with FIGS. 1 and 2, the division will be processed by the logic 321 to obtain new values for the current remainder, and a first integer portion of the current remainder will be a new or next quotient digit. The iterative processing produces a new quotient 324 digit for each processing cycle. Each new current remainder is determined by the logic 321 by evaluating the expression of a first product and subtracting the sum of a first integer portion of the current remainder minus a product represented by the first integer portion of the current remainder multiplied by 1 minus the scaled denominator.

Thus, the logic 321, in some embodiments for efficiency purposes, restates the scaled denominator as 1 minus the scaled denominator. The logic 321 then stores this value within the processor 320 or memory accessible to the processor 320 during initialization. Since the revised scaled denominator is approximately 1, when the logic 321 stores the sum of 1 minus the scaled denominator one or more leading digits of the sum will be insignificant (e.g., zeros or ones by a factor of the radix). Thus, by performing this processing the required data width for calculating the high radix division is reduced from what has been conventionally achieved. This results in more efficient use of space within the processor 320 and reduces power consumption. Moreover, this permits microprocessor architectures to use standard cell libraries to perform very high radix division. Conversely, conventional architectures require specialized cell libraries to process very high radix division.

Next, the logic 321 enters a processing loop to iteratively determine the quotient 324 for the very high radix division. During the first iteration, the first quotient digit is the first integer portion of the scaled numerator, since the scaled denominator is approximately 1. In some embodiments, the logic 321 can adjust the iteratively determined quotient digits by rounding them upward/downward based on digit values associated with the trailing portion of a current remainder (trailing portion of the scaled numerator for the first iteration).

On each processing iteration following the first iteration, the logic 321 determines a new value for a current remainder. The logic 321 takes a first integer portion of the previous current remainder and multiplies it by the radix to acquire a first product. Next, the first integer portion of the previous current remainder is subtracted from the first product. Then, a second product is acquired by multiplying the saved and restated scaled denominator (1-scaled denominator) by the first integer portion of the previous current remainder. Finally, the second product is added to the first product to acquire a new value for the current remainder. This new current remainder will then have its first integer portion used as a next quotient digit for the quotient 324 that is being iteratively assembled. Moreover, the new current remainder is recycled back in the logic 321 for another processing cycle where the new current remainder becomes the previous current remainder.

The logic 321 continues this processing until a desired precision is reached or until a current remainder value of 0 is obtained. Moreover, as was previously discussed and in some embodiments, during each processing cycle the first integer portion of the current remainder can be rounded upward/downward based on the trailing portion of the current remainder before providing the next quotient digit for the quotient 324.

One of ordinary skill in the art now appreciates upon reading the above disclosure how very high radix division can be achieved with narrow data paths using the embodiments of the present invention. The narrow data path results in less space requirements and less power consumption than what is needed with conventional approaches. Moreover, the techniques discussed in various embodiments of the present invention maintain conventional processing throughput of conventional systems and in some case improve processing throughput. Additionally, the tenets of the various embodiments of the present invention can be used with standard microprocessor architectures, unlike conventional techniques that require specialized cell libraries to perform very high radix division.

It is to be understood that the above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A processor implemented high radix division system, comprising:
   a data structure having approximate factors at a desired precision for reciprocal numbers;
   a processor having access to the data structure;
   logic processing on the processor for receiving a numerator and a denominator associated with a high radix division; and
   wherein the logic uses the data structure to acquire a denominator factor and restates the high radix division into a division of the numerator multiplied by the denominator factor divided by the denominator multiplied by the denominator factor, and the logic iteratively forms a quotient by subtracting an integer first portion of a changing current remainder from a first product and adding a second product, the first product acquired by multiplying the current remainder by a radix, and the second sum acquired by multiplying an integer first portion of the changing current remainder by a sum of one minus the denominator multiplied by the denominator factor, wherein the logic includes hardwired components associated with the processor.

2. A processor implemented high radix division system, comprising:
   a data structure having approximate factors at a desired precision for reciprocal numbers;
   a processor having access to the data structure;
   logic processing on the processor for receiving a numerator and a denominator associated with a high radix division; and
   wherein the logic uses the data structure to acquire a denominator factor and restates the high radix division into a division of the numerator multiplied by the denominator factor divided by the denominator multiplied by the denominator factor, and the logic iteratively forms a quotient by subtracting an integer first portion of a changing current remainder from a first product and adding a second product, the first product acquired by multiplying the current remainder by a radix, and the second sum acquired by multiplying an integer first portion of the changing current remainder by a sum of one minus the denominator multiplied by the denominator factor, wherein the logic performs the high radix division using a standard cell library adder and multiplier.

* * * * *